(12) United States Patent
Verelst et al.

(10) Patent No.: US 8,069,528 B2
(45) Date of Patent: *Dec. 6, 2011

(54) WIPER LEVER COMPRISING A WIPER ARM AND A WIPER BLADE WHICH IS CONNECTED TO THE SAME IN AN ARTICULATED MANNER

(75) Inventors: Hubert Verelst, Tienen (BE); Eric Windmolders, Kermt (BE); Christian Wilms, Beringen (BE); Hans Beelen, Herk de Stad (BE); Robert Vertongen, Heusden-Zolder (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,447

(22) Filed: Jan. 11, 2010

(65) Prior Publication Data
US 2010/0107354 A1  May 6, 2010

Related U.S. Application Data

(63) Continuation of application No. 10/509,716, filed as application No. PCT/DE03/01030 on Mar. 28, 2003, now Pat. No. 7,669,276.

(30) Foreign Application Priority Data

| Apr. 4, 2002 | (DE) | ................................ | 102 14 956 |
| Jul. 23, 2002 | (DE) | ................................ | 102 33 531 |
| Aug. 8, 2002 | (DE) | ................................ | 102 36 385 |
| Sep. 19, 2002 | (DE) | ................................ | 102 43 662 |
| Dec. 12, 2002 | (DE) | ................................ | 102 57 988 |

(51) Int. Cl.
*B60S 1/40* (2006.01)
(52) U.S. Cl. .............. 15/250.32; 15/250.351; 15/250.43
(58) Field of Classification Search ............... 15/250.32, 15/250.43, 250.44, 250.351, 250.361, 250.46
See application file for complete search history.

(56) References Cited

U.S. PATENT DOCUMENTS
3,408,680 A * 11/1968 Heller ..................... 15/250.452
(Continued)

FOREIGN PATENT DOCUMENTS
| DE | 8522252 | | 11/1986 |
| DE | 4224866 A1 | | 2/1994 |
| DE | 19860644 | | 7/2000 |
| GB | 2019203 | * | 10/1979 |
| GB | 2193432 | * | 2/1988 |

(Continued)

*Primary Examiner* — Gary Graham
(74) *Attorney, Agent, or Firm* — Michael Best & Friedrich LLP

(57) ABSTRACT

A wiper lever (10) with a wiper arm (12) and a wiper blade (14) linked to it to clean windows of motor vehicles in particular is proposed, whose wiper blade is provided with a band-like, long-stretched-out, elastic supporting element (22) that is curved in the longitudinal direction over its band surfaces (26, 28), which features a rubber elastic wiper strip (30) that can be applied to the window on its concave-curved band surface (26), on whose convex-curved band surface (28) an articulated part (20) sits, on which an adapter (40) is positioned so that it can move in a pendulum fashion, which has walls (42) aligned in the longitudinal direction of the wiper blade and standing on the band surfaces of the supporting element (22) with planes situated at a distance from one another, and locking means (72) are arranged on the adapter that are moveable against a restoring force, which cooperate with counter-locking means (66) of the wiper arm. A particularly operationally reliable connection between the wiper arm and the wiper blade to form the wiper lever is achieved if the locking means are arranged on at least one of the two walls (42) and are moveable essentially transverse to the surfaces of these walls.

18 Claims, 8 Drawing Sheets

U.S. PATENT DOCUMENTS

| | | | |
|---|---|---|---|
| 3,576,044 A * | 4/1971 | Besnard | 15/250.32 |
| 3,757,377 A * | 9/1973 | Hayhurst | 15/250.32 |
| 3,899,800 A * | 8/1975 | Wittwer et al. | 15/250.32 |
| 4,120,069 A * | 10/1978 | Sharp et al. | 15/250.32 |
| 4,308,635 A * | 1/1982 | Maiocco | 15/250.32 |
| 4,445,249 A * | 5/1984 | Harbison et al. | 15/250.32 |
| 5,070,573 A * | 12/1991 | Journee et al. | 15/250.32 |
| 6,654,983 B1 * | 12/2003 | Raynaud | 15/250.32 |
| 6,687,948 B2 * | 2/2004 | Kotlarski | 15/250.32 |

FOREIGN PATENT DOCUMENTS

| | | |
|---|---|---|
| JP | 423555 U | 2/1992 |
| JP | 8225063 | 9/1996 |
| JP | 8225063 A | 9/1996 |
| JP | 2001063531 | 3/2001 |
| WO | 02/40328 | 5/2002 |
| WO | 02/053421 | 7/2002 |
| WO | 03/080409 A1 | 10/2003 |

* cited by examiner

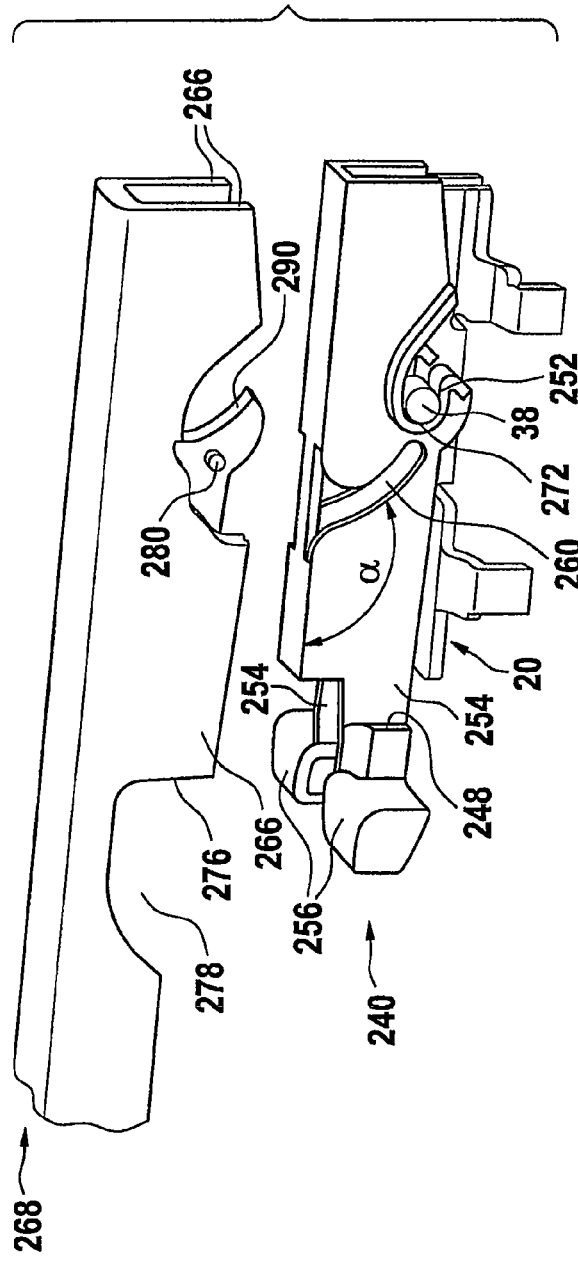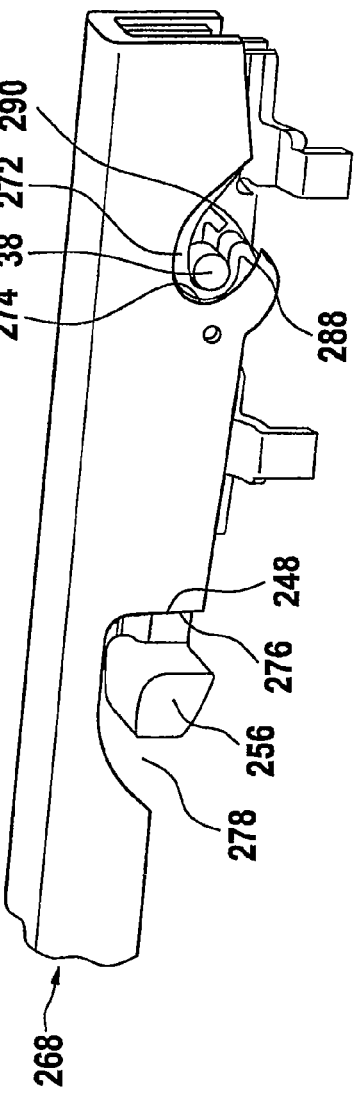

WIPER LEVER COMPRISING A WIPER ARM AND A WIPER BLADE WHICH IS CONNECTED TO THE SAME IN AN ARTICULATED MANNER

RELATED APPLICATIONS

This is a continuation application of U.S. application Ser. No. 10/509,716, filed Jun. 17, 2005, which is a national stage filing under 35 U.S.C. 371 of International Application No. PCT/DE2003/001030, filed Mar. 28, 2003, the entire contents of which are herein incorporated by reference.

BACKGROUND OF THE INVENTION

The invention relates to a wiper lever. The wiper lever includes a driven wiper arm on which a wiper blade that can be moved over the to-be-wiped window transverse to its longitudinal extension is linked at a distance from this drive end. The articulated axis of the wiper blade essentially extends in its displacement direction. This articulation is of special importance because the to-be-wiped, generally spherically curved window (e.g., the windshield of a motor vehicle) does not represent a section of a spherical surface. As a result, it must be able to continually adapt the wiper blade during its wiper movement to the respective position and progression of the window surface with respect to the movement plane of the wiper arm. An oscillating movement of the wiper blade vis-à-vis the wiper arm around the aforementioned articulated axis is required for this. In a known generic wiper lever (German Laid Open Print DE-OS 10065124), a wiper blade is provided with correspondingly aligned articulated pins via an articulated part that is solidly connected to it, on which an adapter that belongs to the wiper blade is linked, via which the wiper blade can be attached to the wiper arm. Locking means located on the adapter are supposed to provide for an operationally reliable connection between the wiper arm and the wiper blade in cooperation with counter-locking means of the wiper arm. In the case of this adapter that is U-shaped in cross-section, the walls are formed by the two U-legs of the adapter. The adapter is provided with a tongue featuring a locking tooth that is elastically deflectable parallel to the alignment of the walls on its wall forming the U-base that is at a distance from the wiper blade. This tongue extends beyond the end of the wiper arm, whereby the locking tooth acting as the locking means cooperates with counter-locking means of the wiper arm in the sense of a detachable wiper blade safety device.

However, the exposed tongue can also be deflected unintentionally—for example by rotating brushes in car wash facilities—in such a way that the wiper blade detaches from the wiper arm and the vehicle is damaged.

SUMMARY OF THE INVENTION

In the case of the wiper lever in accordance with the invention, the locking means that are arranged on at least one of the two walls of the adapter and are moveable essentially transverse to the surfaces of these walls require conscious, purposeful handling to detach the lock. Such handling is possible without restriction in the case of the subject of the invention, because access for such handling is also visually free and the detaching movement does not require any difficult hand movements. However, brushes in a car wash cannot trigger the transverse movement required to detach the lock.

In this connection, it is particularly advantageous with respect to a compact design of the articulated connection if, in accordance with a development of the invention, the adapter has a U-shaped cross-section at least in sections, whose U-legs form the two walls between which supporting walls embodied on the articulated part suitably dip.

Particular structural advantages and good wiper blade guidance in the wiping direction is guaranteed if the adapter suitably grips over two longitudinal walls of the articulated part, which are situated at a distance from one another, with its U-legs, if, further, the articulation means are arranged on the longitudinal walls and on the U-legs and if, in addition, the locking means of the adapter that is composed of an elastic material are located on an extension of the U-legs of the adapter extending beyond the longitudinal walls.

A compact structure of the articulated connection is yielded with connecting means integrated into it, if in a development of the invention the wiper arm that is driven in a pendulum fashion accommodates the adapter with a connecting piece that is U-shaped in cross-section and the extension of the adapter extends towards the pendulum axis.

In order to reduce environmental effects on the required easy-running capacity of the articulated connection and the operational reliability of the lock between the wiper arm and wiper blade, the locking means of the adapter are located on the outer side of the extension facing the U-legs of the connecting piece that is provided with the counter-locking means of the wiper arm.

The lock itself can also be achieved in a particularly simple manner in that limit stops that are aligned opposing one another at a distance from one another in the longitudinal direction of the adapter are embodied on the adapter, which are assigned counter-limit stops located on the connecting piece of the wiper arm. Such an arrangement also provides for the required securing of the wiper blade on the wiper arm in its longitudinal direction.

In order to the keep manufacturing costs as low as possible, at least one of the limit stops located on the adapter is formed by its locking means.

To improve the operational reliability of the connection between the wiper arm and the wiper blade, locking means are arranged on each of the two U-legs of the adapter, whereby in the case of such an embodiment of the invention, counter-locking means that cooperate with the locking means of the adapter are expediently located on each of the two U-legs of the connecting piece.

A simple, weight-saving articulation is achieved if this articulation includes two articulated bolts projecting out of the two longitudinal walls of the articulated part, whose axes are aligned with one another. This articulation is also achieved via bearing receptacles, which are arranged in the U-legs of the adapter and assigned to the articulated bolts, each of which are open-edged via an assembly channel terminating on the free end of the U-leg that has been coordinated with the diameter of the respective articulated bolt.

So that the adapter belonging to the wiper blade is held captively after its assembly on the articulated part, each assembly channel is provided with an elastically expandable narrowing.

In order to improve the service life of the highly stressed bearing receptacles for the articulated bolts, each U-leg of the adapter is provided on its outer side with a collar-like projection encircling the bearing receptacle, to which a recess is assigned, which is open to the free end of the respective U-leg and is adapted at least in sections to the contour of the projection.

A simplification of the articulated connection and the embodiment of the locking means between the wiper arm and wiper blade is achieved if the collar-like projections together with the section of the recesses that are adapted to its progression form the limit stops and counter-limit stops.

The adapter is provided on at least one of its U-legs with an elastically deflectable tongue that features a locking tooth, whereby the locking tooth that forms a locking means has a limit stop shoulder pointing towards the collar-like projection, which cooperates with a counter-limit stop shoulder embodied on the connecting piece and pointing away from the collar-like projection.

According to a special embodiment of the invention, the recess in the U-legs of the connecting piece that is assigned to the collar-like projection has a progression that is curved from its opening at the free end of the U-legs toward the counter-limit stop shoulder. As a result, a residual wall tongue of the connecting piece grips under the collar-like projection of the adapter in its to-be-locked operating position and the position of the adapter is determined in the connecting piece.

In order to clearly indicate, also to the layman, the positioning of the wiper blade on the wiper arm that is to be observed in assembly, in the case of one embodiment of the invention, pin-like supports that align with one another are arranged on each outer side of the U-legs of the adapter at the longitudinal end area facing away from the locking means, to which a support bearing embodied on the front side of the U-legs of the connecting piece is assigned. Inserting the supports into the support bearings automatically produces a position from which a swiveling of the wiper blade vis-à-vis the wiper arm around the common axis of the supports produces the proper operating position of the two parts of the wiper lever to one another.

The position of the wiper blade in the longitudinal direction of the wiper arm in this operating position is fixed in a simple manner if the locking tooth of the adapter is provided with a holding shoulder pointing away from the U-base of the adapter, which is assigned a counter-holding shoulder embodied on the connecting piece and pointing to its U-base.

In a development of the invention, guiding means located both on the connecting piece of the wiper arm as well as on the wiper blade, in particular on its adapter, cooperate during assembly of these components in such a way that their proper positioning vis-à-vis each other is automatically achieved.

Such assembly assistance can be achieved cost-effectively if the guiding means of the wiper blade are formed by a groove-like link guide located in the U-legs of the adapter and terminating at its U-base, into which the guiding means embodied as guide pins and arranged on the connecting piece dip. The progression of the link guide can then be adapted to the respective requirements so that assembly errors are excluded.

Problem-free joining of the wiper blade or of the adapter and the connecting piece of the wiper arm is produced if the guide groove is provided with a funnel-like expansion at its termination.

So that the forces acting on the articulated connection during wiper operation are securely intercepted, the collar-like projection is adjacent, with a supporting shoulder that points towards the free end of the U-leg, to a counter shoulder of the connecting piece.

For simple operation of the connecting means as well as to detach the articulated connection, a laterally projecting handle is arranged on the extension of the U-legs that features the locking means of the adapter.

Additional advantageous developments and embodiments of the invention are disclosed in the following description of the exemplary embodiments depicted in the associated drawings.

BRIEF DESCRIPTION OF THE DRAWINGS

The drawings show:
FIG. 10 An intermediate assembly position of the individual parts depicted in FIG. 9.
FIG. 11 The individual parts according to FIG. 9 shown assembled in the operating position.

DETAILED DESCRIPTION

Figure 1:
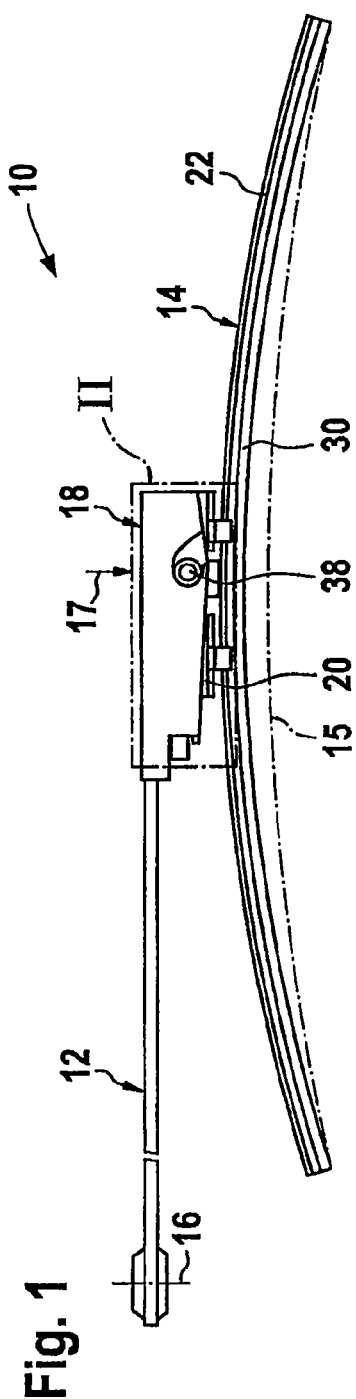
FIG. 1 A side view of a wiper blade linked to the free end of a wiper arm.
Figure 2:
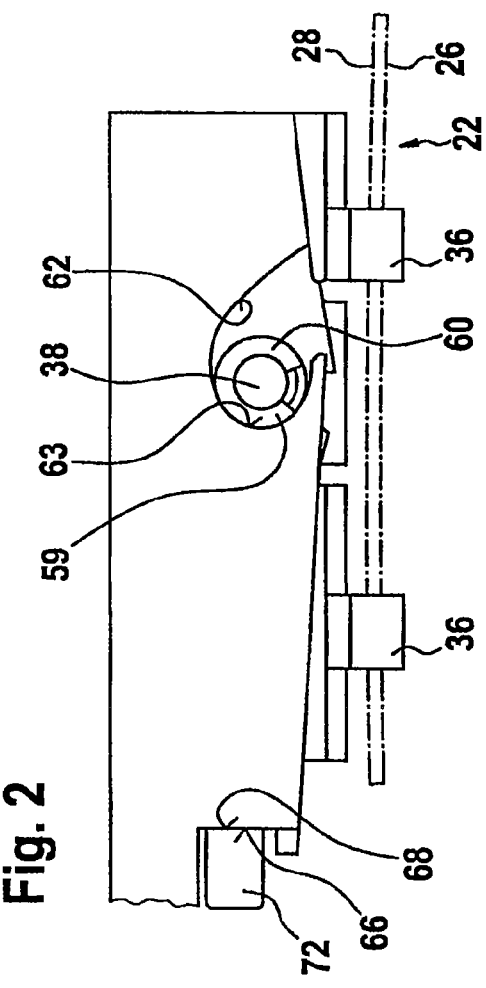
FIG. 2 An enlarged depiction of a detail designated by II in FIG. 1 forming the articulated connection between the wiper blade and the wiper arm.
Figure 4:
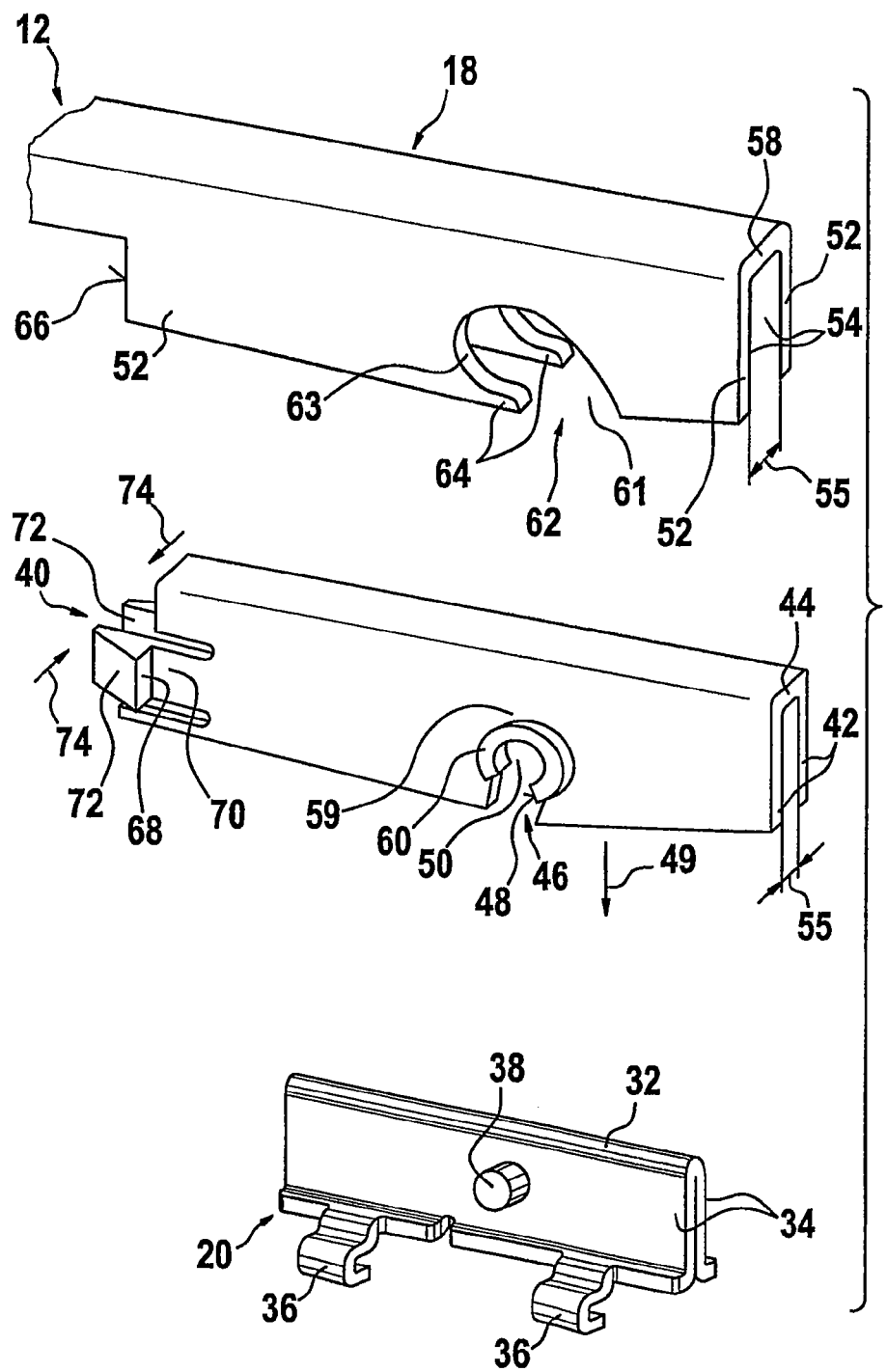
FIG. 4 The individual parts of the articulated connection according to FIG. 2 shown in perspective as an exploded representation.
Figure 8:
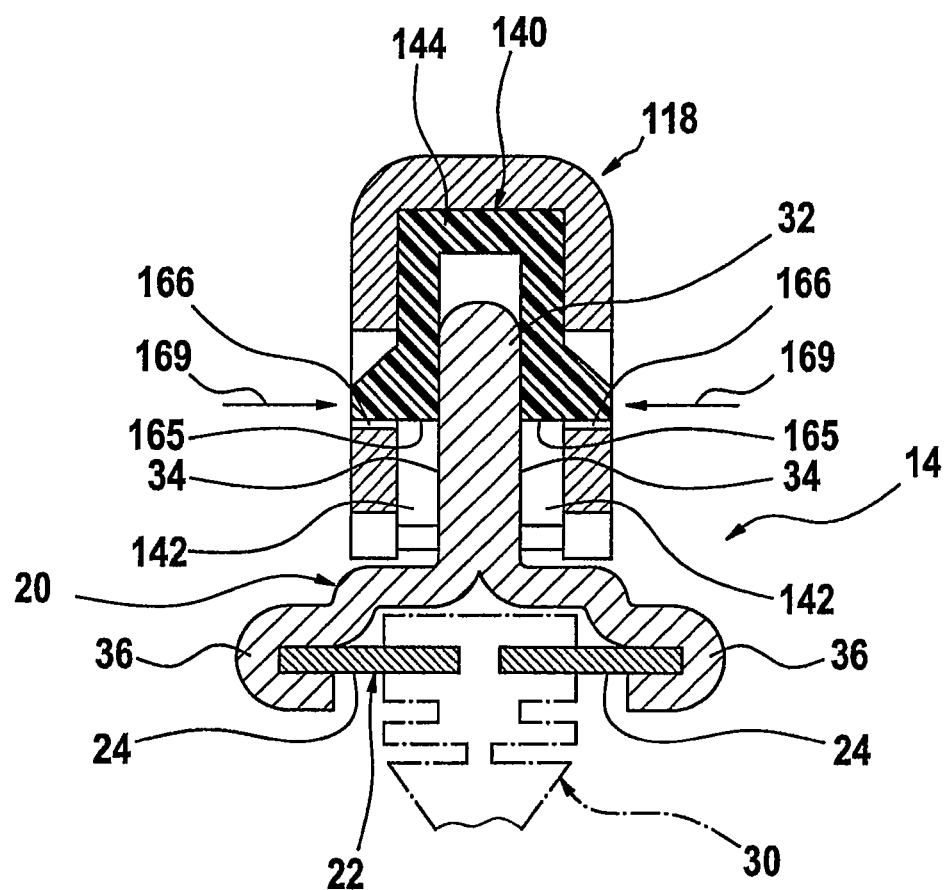
FIG. 8 A section along Line VIII-VIII through the articulated connection according to FIG. 7.
Figure 9:
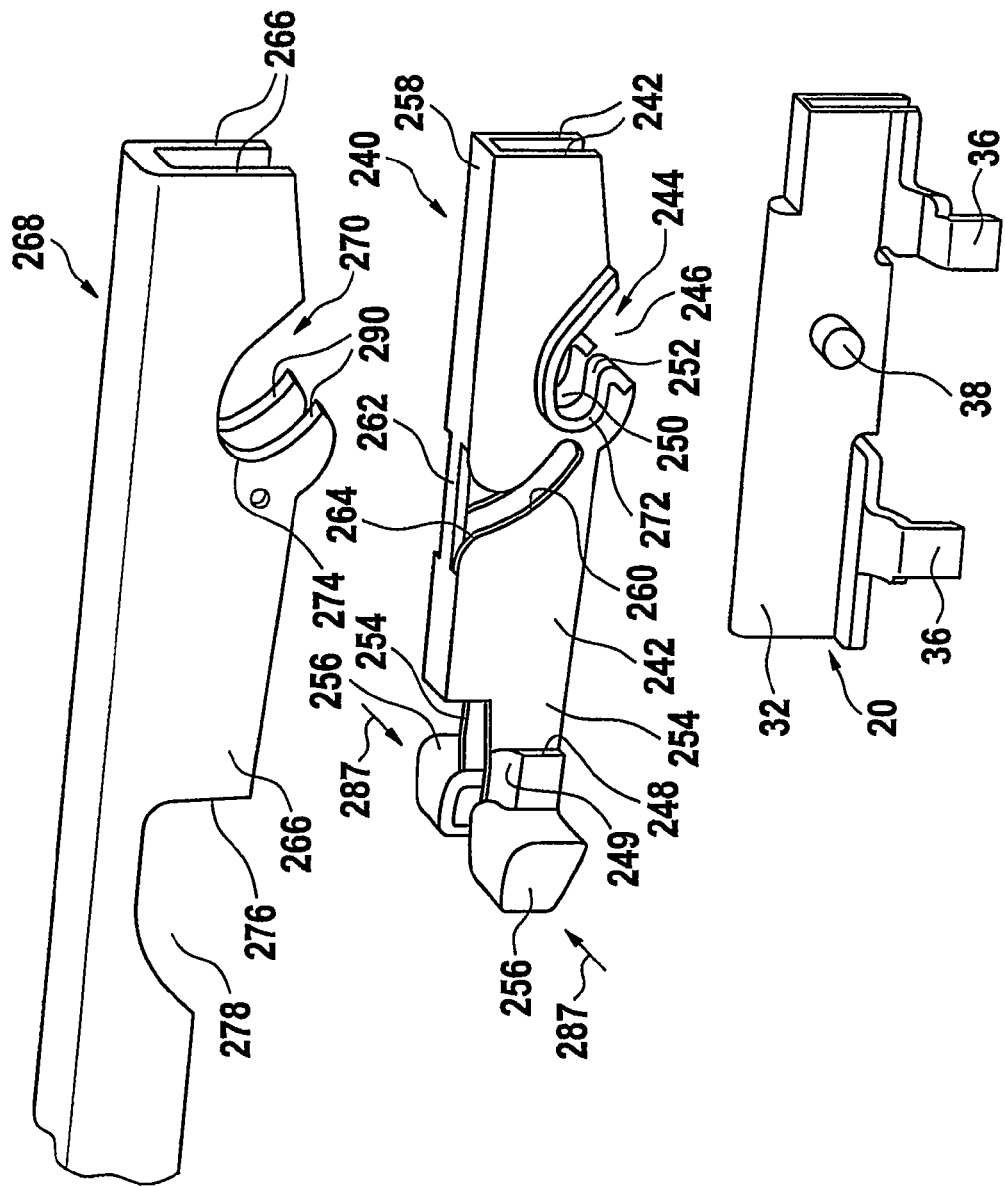
FIG. 9 An exploded representation of the individual parts of another articulated connection shown in a perspective arrangement.
Figure 12:
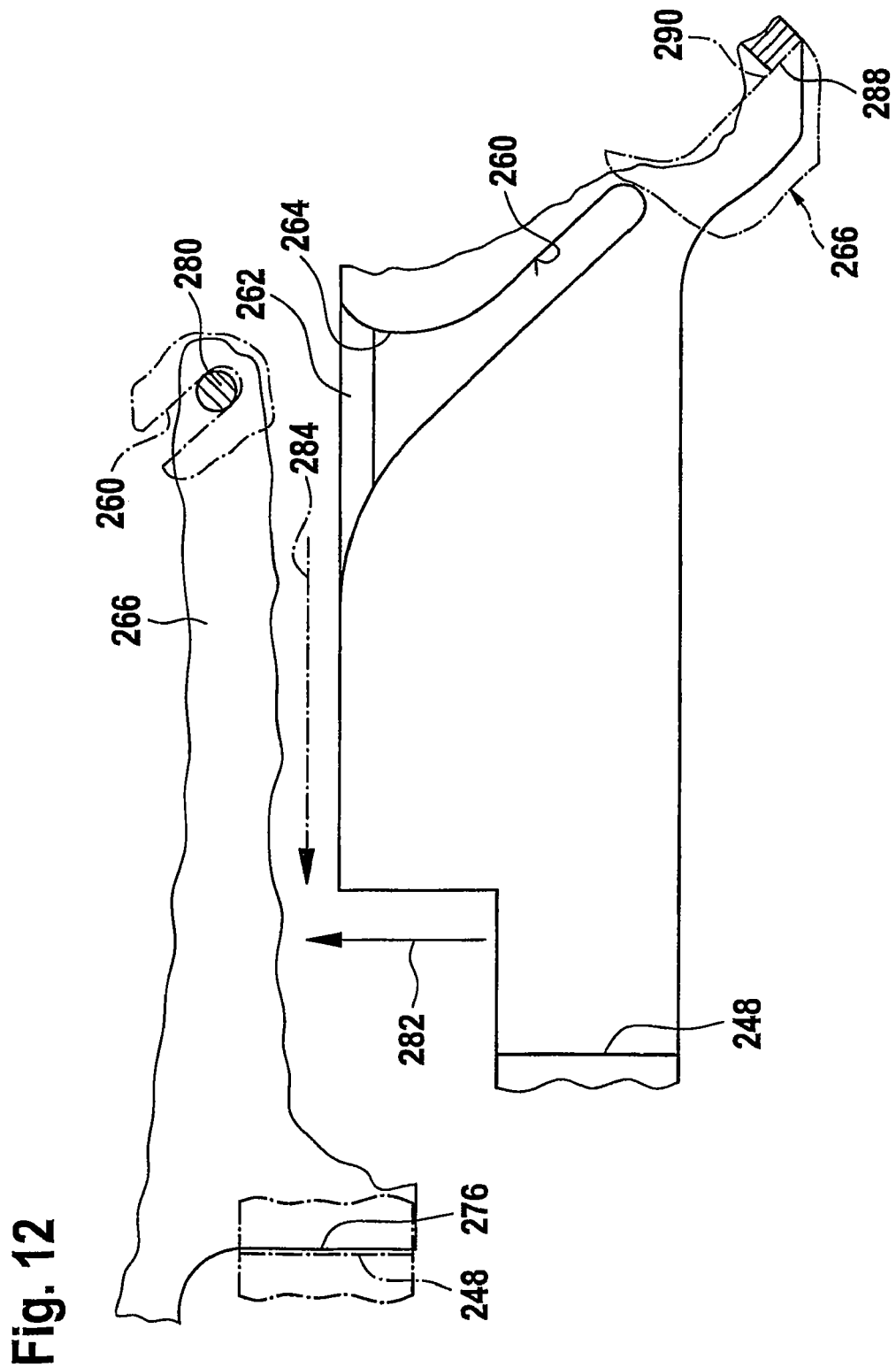
FIG. 12 A greatly enlarged partial depiction of the arrangement according to FIG. 10 in order to explain assembly.

A wiper arm 12 and a wiper blade 14 linked to it are a part of a wiper lever 10 depicted in FIG. 1. The wiper arm 12 is driven in a pendulum fashion on its one end around an axis 16. In order to be able to produce the articulated connection between wiper arm and wiper blade in a simple manner, the wiper arm is provided with coupling piece 18 on its other free end (FIGS. 1 and 4), on which the wiper blade 14 can be attached to an articulated part 20 via an adapter. The articulated part 20 is solidly connected to a supporting element 22 of the wiper blade 14, which in the exemplary embodiment has two spring rails 24 shown in a dot-dashed line in a common plane and lying at a distance from one another (FIG. 2). The so formed, band-shaped, long-stretched-out, elastic supporting element 22 is curved in its longitudinal direction over its band surfaces 26 and 28 (FIG. 1). A rubber elastic wiper strip 30 that can be applied to the to-be-wiped window 15 in the direction of arrow 17 is arranged on its concave-curved band surface 26 and an articulated part 20 sits on its other convex-curved band surface 28. This arrangement can be seen especially clearly in FIG. 8 where the wiper strip 30 is indicated as a dot-dashed line. As FIGS. 4 and 8 show, the articulated part 20 has a longitudinal wall 32, whose two longitudinal cheeks 34 that face away from one another form guide surfaces or supporting walls. The longitudinal wall 32 is provided with holding claws 36, which grip around the longitudinal edges of the two spring rails 24 that face away from one another and secure the two spring rails 24 in the required installation position. This can be accomplished using means acting via positive engagement and/or friction. It is also conceivable to weld the articulated part 20 to the spring rails 24 in the area of the holding claws 36. An articulated pin 38, which is aligned transverse to the longitudinal direction of the longitudinal wall and forms the articulation means on the wiper blade side, projects from the longitudinal wall 32 or from its longitudinal cheeks 34 on both sides. FIG. 4 only shows the one articulated pin that is arranged on the side facing the observer, however. The axes of the two articulated pins 38 are aligned with one another. In addition, the aforementioned adapter 40 (FIG. 4), which is manufactured of an elastic plastic, is also a part of the wiper blade 14. The adapter 40 essentially has a U-shaped cross-section (FIG. 4), whose U-legs 42 that form two walls extend from the U-base 44 to the supporting element 22. The distance between the two U-legs 42 is coordinated with the thickness of the longitudinal wall 32 in such a way that it can be accommodated with little play between the two legs 42 (FIG. 8). To make this possible, the two U-legs 42 are provided with assembly channels or receptacle slots 46 that are open-edged towards their free ends, each of which transition to bearing receptacles 50 for the articulated pins 38 via a narrowing 48. As a result, it is possible to lock the adapter 40 captively with the articulated part 20, because the narrowing 48 permits the articulated pins to arrive in their bearing receptacles 50 during the temporary elastic expansion that occurs when locking the adapter 40 on the articulated pins 38 of the articulated part 20. Afterwards, it springs back and prevents the adapter 40 from being detached from the articulated pins 38. The adapter 40 is thereby held in a captive manner on the coupling element 20 or on its articulated pins 38 so that it can move in a pendulum fashion around the longitudinal axis of the articulated pins 38. The wiper blade can be connected to the coupling piece 18 of the wiper arm with the aid of this adapter 40 that is a part of the wiper blade 14. An extremely expedient design provides for the coupling piece 18 of the wiper arm 12 to also have a U-shaped cross-section. This cross-section is dimensioned in such a way that guide walls 54 for the wiper blade that are embodied on the U-legs 52 of the coupling piece 18 are located at a distance 55 from one another that is appropriately coordinated with the width 56 of the adapter 40. The U-base wall 58 of the coupling piece 18 forms a covering for the articulated connection in a practical way.

The design features of the articulated connection that have been described so far are present independent of significance for the invention in the case of all exemplary embodiments of the invention described in the following. The individual exemplary embodiments of the invention differ particularly in terms of the arrangement and design of the locking means, which always provide for an operationally reliable connection between the wiper arm and wiper blade 14, when the wiper blade 14 with its adapter 40 has been inserted between the facing guide walls 54 of the U-legs 52 (FIG. 2). As a result, the following will still explain primarily these locking means and their design and arrangement, which however differ from one another more or less strongly in the case of the different exemplary embodiments.

Because the adapter 40 accommodates the longitudinal walls 32 of the articulated part 20 between its U-legs 42 free of play or at least with little play, and, in addition, the facing guide walls 54 on the U-legs 52 of the coupling piece 18 also grip over the U-legs 42 free of play, outstanding guidance is produced for the wiper blade if it is moved over the to-be-wiped window 15 transverse to its longitudinal extension. Guidance of the wiper blade on the wiper arm that is as free of play as possible is the objective, because this counteracts the tendency of the wiper blade 14 to rattle against the window 15.

Figure 3:
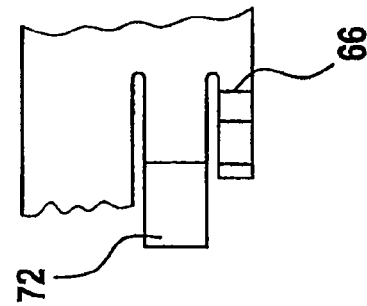
FIG. 3 A perspective partial depiction of the detail in accordance with FIG. 2, viewed in the direction of Arrow III in FIG. 2.

A first embodiment of the invention will now be explained in the following on the basis of FIGS. 2 through 4. The adapter 40 has a collar-like projection 60 on each of its two outer leg cheeks that face away from one another, which encircles the respective bearing receptacle 50. This collar-like projection 60 increases the bearing surface of the bearing receptacles 50 and also stabilizes the adapter 40 at least in the area where the receptacle slots 46 for the articulated bolt or the articulated pin 38 of the articulated part 20 are arranged. Each of these two collar-like projections 60 is assigned an open-edged recess 62 in the U-legs 52 of the coupling piece 18 featuring the guide walls 54. The recesses 62 terminate at the free ends of the U-legs 52. The end areas 63 of the recesses 62 are adjusted in terms of their shape to the contour of the projections 60. In doing so, the progression of the recesses 62 is curved in such a way that their end areas 63 are closer to the pendulum axis 16 of the wiper arm 12 than their terminations 61 at the free end of the U-legs 52. In this case, the progression of the curvature required to do this is designed so that a safety tongue 64 remains in the edge area of the U-leg 52, which extends from the end area 63 of the recess 62 to the termination 61 of the recess 62 (FIG. 4). A counter-limit stop shoulder 66, which points towards the pendulum axis 16, is embodied on the coupling piece 18 in the extension of the progression of the curvature, i.e., approaching the pendulum axis 16. This counter-limit stop shoulder 66 is assigned to a limit stop shoulder 68, which is embodied on the adapter 40. For this purpose, elastically deflectable extensions or tongues 70 are located on each of the two U-legs 42 of the adapter 40, on whose outer sides a locking tooth 72 is located. The aforementioned limit stop shoulders 68, which point towards the collar-like projections 60, are located on each of the locking teeth 72 (FIG. 4).

Starting from a pre-assembly position (shown in FIG. 4) of the individual elements 12 and 14 belonging to the wiper lever 10, for assembly purposes first the adapter 40 of the wiper blade is put on the articulated part 20 of the wiper blade 14 in the direction of arrow 49. Under the effect of the temporary elastic expansion of the narrowing 48 in the U-legs 42 of the adapter 40, the articulated pins 38 of the articulated part 20 arrive in their bearing receptacles 50 via the receptacle slots 46 serving as assembly channels. The coordination of the dimensions of these components is accomplished in such a way that the adapter can be moved around the common axis of the articulated pins 38 in a pendulum fashion within certain limits. In addition, the tongues 70 extend beyond the longitudinal wall 32 of the articulated part 20 so that when overcoming a restoring force they can essentially be moved transverse to the longitudinal cheeks or surfaces 34 of the longitudinal wall 32 that face away from one another. To join the wiper lever, the wiper blade 14 with its adapter 40 is now inserted between the U-legs 52 of the coupling piece 18 of the wiper arm that serves as the connecting piece. In doing so, the collar-like projections 60 are inserted into the recesses 62 via the terminations 61 until the collar walls 59 hit the end areas 63 of the recesses 62. During this insertion movement, the tongues 70 arranged on the walls or on the U-legs 42 of the adapter 40 are manually deflected towards each other, i.e., transverse to the surfaces 34 so that the locking teeth 72 can also reach between the U-legs 52 of the connecting piece 18. When the collar walls 59 of the projections 60 then hit against the end area sections 63 of the recesses 62 (FIG. 2), the limit stop shoulders 68 of the locking teeth 72 protrude over the counter-limit stop shoulders 66 and spring back into their initial position. In doing so, the limit stop shoulders 68 grip behind the counter-limit stop shoulders 66 in a hook-like manner (FIGS. 2 and 3). As the consequence of a corresponding coordination of dimensions, the wiper blade 14 is now fixed on the wiper arm 12 in its longitudinal direction, because the distance between the end areas 63 and the counter-limit stop shoulders 66 is coordinated with the distance between the limit stop shoulders 68 and the collar walls 59. The areas of the collar walls 59 facing the limit stop shoulders 68 form facing positioning shoulders together with these, which are assigned to counter shoulders facing away from one another (formed by the end areas 63 of the recesses 62 and the counter-limit stop shoulders 66) (FIG. 2). To detach the wiper blade 14 from the wiper arm 12, the two tongues 70 of the adapter 40 must be deflected toward each other (arrows 74 in FIG. 4) until their counter-limit stop shoulders 68 release the limit stop shoulders 66 of the connecting piece 18. Afterwards the wiper blade can be pressed towards the free end of the wiper arm until the projections 60 exit from the recesses 62 so that the wiper blade 14 is detached from the wiper arm.

It is understood that the sides of the connecting piece 18 of the adapter 40 and the articulated part 20 facing away from the observer of the drawing correspond to the described front sides of these components. This statement naturally also applies to the further embodiments of the invention that are still to be described.

Figure 5:
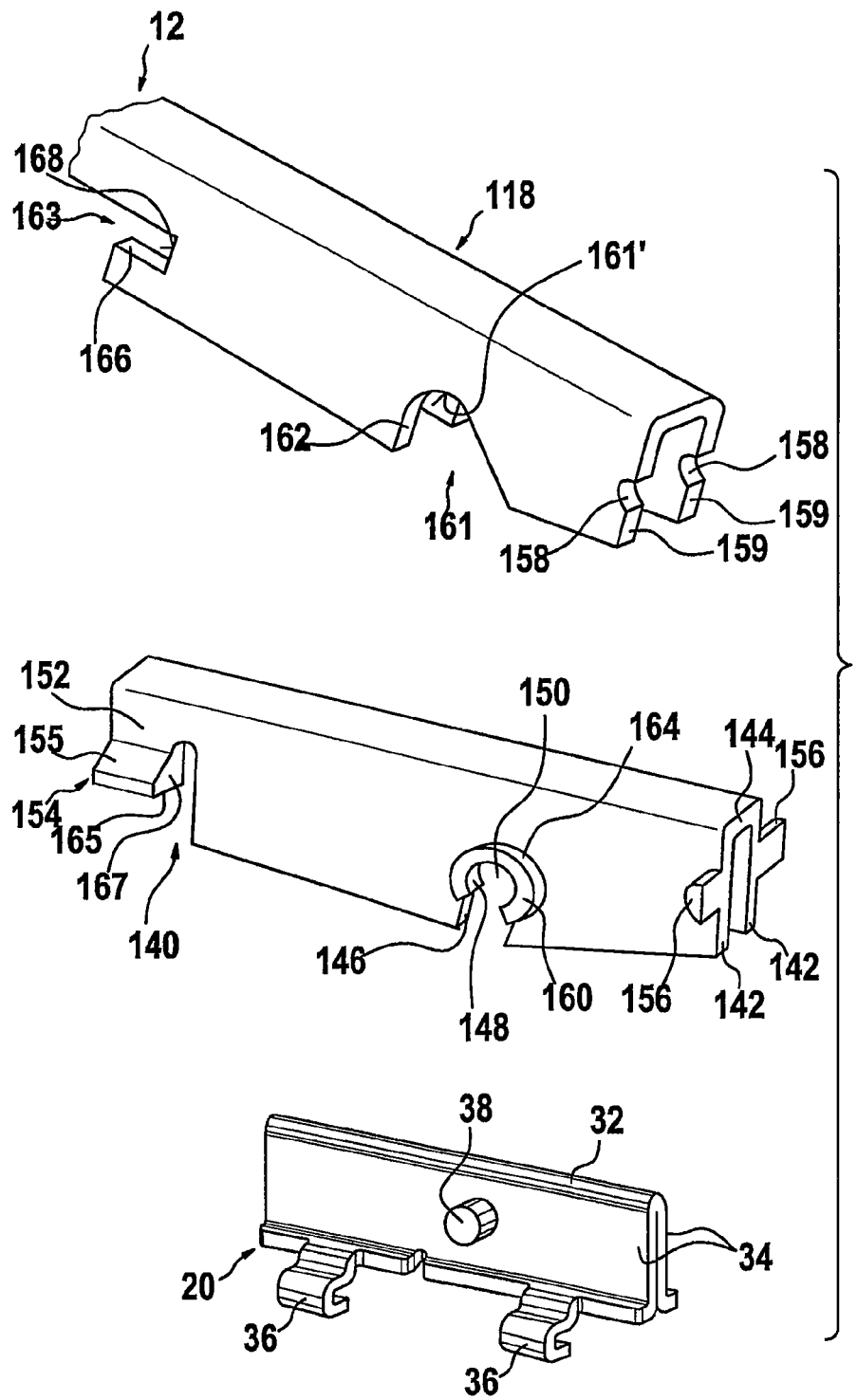
FIG. 5 A perspective exploded representation of the individual parts belonging to an articulated connection that is embodied in another manner.

In the case of another embodiment of the invention depicted in FIGS. 5 through 8, the articulated part 20 corresponds to the articulated part described above. In this embodiment as well, the adapter 140 has a U-shaped cross-section with U-legs 142, which are provided with open-edged receptacle slots 146. The receptacle slots 146 terminate via narrowings 148 in bearing receptacles 150 for the articulated pins 38 of the articulated part 20. Collar-like projections 160 encircle the bearing receptacles 150 and improve the stability of the adapter as well as the bearing of the articulated pins. Deviating from the previously described embodiment of the invention, in the embodiment according to FIGS. 5 through 8, deflectable tongues 152 on the one end of the adapter extend from the U-base 144 of the adapter 140 in the direction of the height of the U-legs 142, which represent walls, between which the supporting walls embodied on the articulated part 20 suitably dip. The tongues 152 are formed by extensions of the U-legs 142. A locking tooth 154 is arranged on each of the tongues 152. These locking teeth extend out from their tongues 152 in opposing directions. They are provided with starting bevels 155 on their upper side facing the U-base 144. On the other side of the adapter 140 with respect to the bearing receptacles 150, this adapter has pin-like supports 156 arranged on the outer side of each U-leg 142, which also extend away from each other and are each provided with a rounding on their sides facing the collar-like projections 160. Assigned to these roundings are recesses 158 that serve as support bearings on the front sides of the U-legs 159 of the connecting piece 118, which is U-shaped in cross-section. In addition, the U-legs of the connecting piece 118 are provided with collar-like projections 160, which are assigned to projections 161 that are open-edged toward the free ends of the U-legs. The recesses 161 each have a shoulder 162 pointing toward the support bearings 158. Related to the recesses 161, notches 163 are provided opposite from the support bearings 158 in the U-legs 159 and these notches are assigned to the locking teeth 154 of the adapter 140 (FIG. 5). The shape of the recesses 161 is adapted in its central area 161' to the progression of the collar walls 164.

Figure 6:
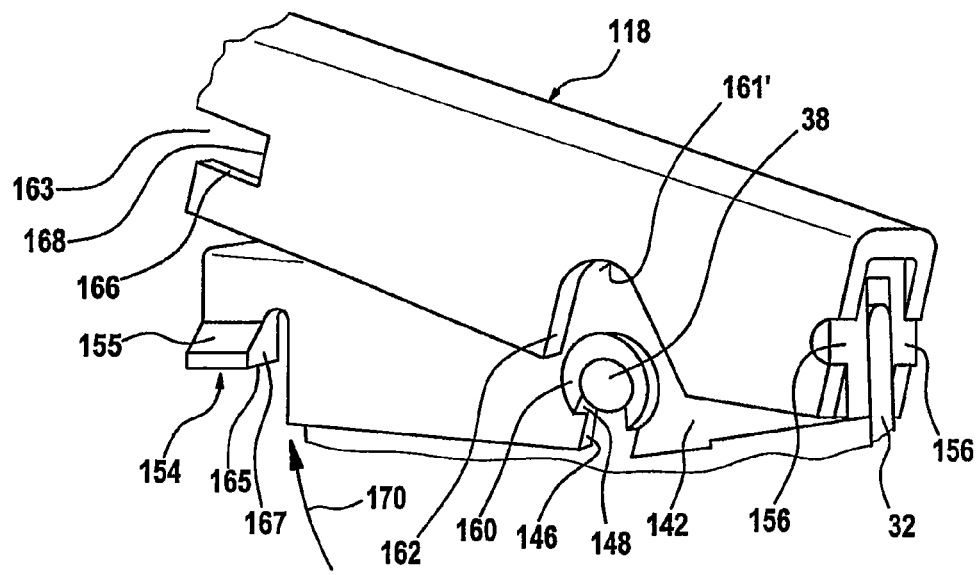
FIG. 6 The individual parts according to FIG. 5 in an intermediate assembly position.
Figure 7:
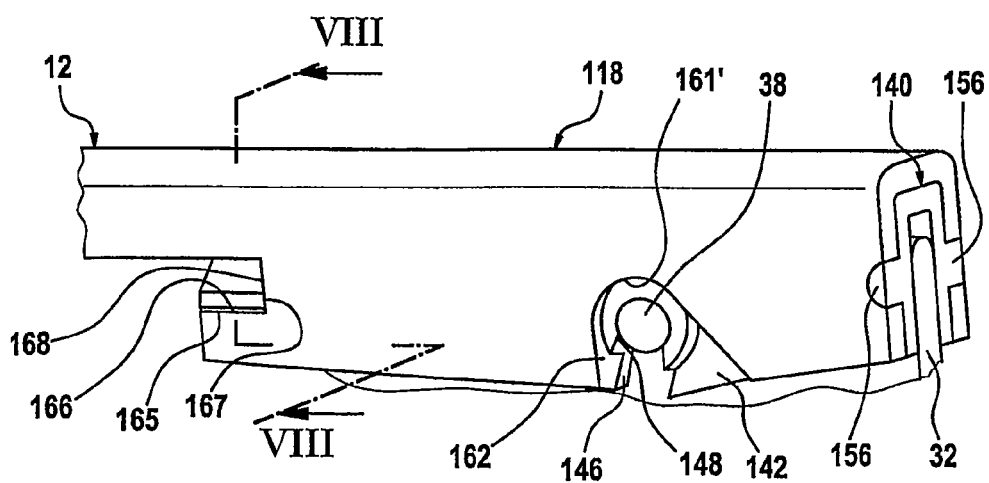
FIG. 7 The articulated connection with the individual parts according to FIG. 5 depicted in the operating position.

As already described, when assembling the wiper lever, the adapter 140 is first connected to the articulated part 20 so that it can move in a pendulum fashion. Then, in accordance with FIG. 6, the wiper blade with its adapter 140 is applied to the connecting piece 118 of the wiper arm in such a way that the pin-like supports 156 lie in the support bearing 158 (FIG. 6). Then the wiper blade is swiveled in the direction of arrow 170 with respect to the wiper arm around a swivel axis of the pin-like supports 156, whereby the collar-like projections dip into their assigned recesses 161 in the U-legs 159 of the connecting piece 118. In doing so, the starting bevels 155 of the locking teeth 154 hit the free ends of the U-legs 159 and are elastically deflected toward one another until they arrive in the notches 163 in the U-legs 159 upon completion of the swivel movement (arrow 170). There the locking teeth 154 spring back into their initial position (FIGS. 7 and 8). Holding shoulders 165 arranged on the locking teeth 154 and pointing away from the U-base of the adapter cooperate in the process with the counter-holding shoulders 166 embodied at the notches 163 in such a way that a detaching movement between the wiper arm 12, 118 and the wiper blade 14 directed against the arrow 164 is excluded. In addition, on the locking teeth 154 there are limit stops shoulders 167 pointing to the collar-like projections 160, which cooperate with their assigned counter-limit stop shoulders 168 of the notches 163. The additional shoulders required to longitudinally lock the wiper blade on the wiper arm can either be formed by the shoulders 162 and the collar-like projection 160 and/or be realized by the pin-like supports 156 and their support bearings 158. To detach the wiper blade 14, only the locking teeth 154 have to be manually deflected toward each other (in the direction of arrow 169) until the lock between the locking teeth 154 and the notches 163 is lifted (FIG. 8). Then the wiper blade 14 can swivel against the direction of arrow 170 and detach from the wiper arm. Also in the case of this embodiment of the invention, the locking means are arranged on at least one of the two walls or legs 142 of the adapter 140 and are moveable essentially transverse to the surfaces of these walls.

Another embodiment of the invention is shown in FIGS. 9 through 12. The articulated part 20 of the wiper blade corresponds completely with respect to the invention to the articulated part described above. The adapter 240 also corresponds in terms of its fundamental structure to the adapter 40 in accordance with FIG. 4. Thus, it also has a U-shaped cross-section with U-legs 242 and recesses 244 arranged in the U-legs that are open-edged towards the free ends to accommodate the articulated pins 38 of the articulated part 20. The progression of the recesses 244 is arranged in such a way that their terminations 246 are further away from the limit stop shoulders 248 than the bearing receptacles 250 for the articulated part's 20 articulated pins 38 that are located at the ends of the recesses 244. The recesses 244 in this embodiment are also each provided with an elastically expandable narrowing 252 to secure the adapter 240 on the articulated part 20. Moreover, the recesses 244 feature collar-like projections 272, which extend along the entire edge of the respective recess. The limit stop shoulders 248 are arranged on tongue-like extensions 254 of the U-legs 242 and dimensioned in such a way that they extend with limit stop shoulders 248 beyond the longitudinal wall 32 of the articulated part 20. Thus, the limit stop shoulders can each be moved against a restoring force essentially transverse to the surfaces of the U-legs or walls 242 of the adapter 240 (arrow 287 in FIG. 10). The tongue-like extensions 254 are also each provided with handles 256 in order to better operate these locking means. Furthermore, the adapter 240 has a guide slot 260 in the center area, which extends from the U-base 258 of the adapter 240 that is U-shaped in cross-section to the free ends of the U-legs 242. However, a stabilizing bridge 262 remains between the guide slots 260 in each U-leg 242. The progression of the guide slot 260 is selected in such a way that it encloses an obtuse angle $\alpha$ with the U-base from its terminations at the U-base 258 to its sides facing the limit stop shoulders 248

(FIG. 10). The groove-like guide slots 260 are each provided with a funnel-like expansion 264 in the area of their terminations. As FIG. 9 in particular shows, the U-legs 266 of the wiper arm/connecting piece 268 also feature open-edged recesses 270 for the collar-like projections 272 of the adapter 240, which are open-edged towards free ends of the U-legs 266. In this case, the end areas 274 of these channel-shaped recesses 270 are closer to the counter-limit stop shoulders 276, which are embodied on the U-legs 266 of the connecting piece 268 and point away from the base or end areas 274 of the recesses 270. The counter-limit stop shoulders 276 are embodied at recesses 278 in the U-legs 266 of the connecting piece 268. Arranged on the facing, internal cheeks of the U-legs 266 are guide pins 280 that are directed against one another, which, in the exemplary embodiment, are formed out of the U-legs and were pushed through to the inside. The diameters of the guide pins 280 are coordinated with the width of the guide slots 260.

When the adapter 240 is supposed to be connected to the articulated part 20, its articulated pins 38 are inserted into its recesses 244 in the U-legs 242 of the adapter 240 until they arrive in the bearing receptacles 250 after overcoming the narrowing 252 (FIG. 10). Now the adapter 240 is connected to the articulated part 20 so that it can move in a pendulum fashion but be held captively and it is ready for the final assembly of the wiper lever 10. To do so, the adapter 240 is inserted between the U-legs 266 of the connecting piece 268 in such a way that the guide pins 280 arrive in the guide slots 260 via the funnel-like expansions 264. This pre-assembly position is shown enlarged in FIG. 12 and the assembly movement is indicated by arrow 282. As this assembly movement proceeds, a transverse movement overlaying it (see dot-dashed arrow 284) is imposed on the wiper blade until the assembly movement is ended. This assembly movement can be simplified via starting bevels 249 arranged on the extensions 254 or on the limit stop shoulders 248. Then the guide pins 280 of the connecting piece 268 will be located in the end area of the guide slots 260 (see dot-dashed representation). Thus, the transverse or displacement direction (arrow 284) is also ended. Corresponding coordination of the dimensions makes sure then that the limit stop shoulders 248 on the extensions 254 of the adapter 240 grip behind the counter-limit stop shoulders 276 on the connecting piece 268 of the wiper arm 12 (see dot-dashed representation in FIG. 12). This then results in the assembly situation depicted in FIG. 11. FIG. 11 also shows that the collar-like projections 272 of the adapter 240 are now adjacent, with a supporting shoulder 288 pointing to the free end of its U-leg 242, to a counter shoulder 290 of the connecting piece 268. This arrangement prevents the narrowings 252 from opening due to outside influences and thereby releasing the wiper blade vis-à-vis the wiper arm.

The description of the assembly makes it clear that the guide slot 260 forms link guides for the guide pins 280, which, in mutual cooperation and without additional measures, forces the striven for final position between the wiper arm and the wiper blade.

To detach the wiper blade 14 from the wiper arm 12, first the two handles 256 or the tongue-like extensions 254 of the U-legs 242 are pressed together transverse to the wall surfaces located on the outer sides of the U-legs of the adapter (arrow 287, FIG. 9) so far that the limit stop shoulders 248 release the counter-limit stop shoulders 276. Then the wiper blade can move against the direction of the arrow 284 (FIG. 12), whereby the guide slots 260, in cooperation with the guide pins 280 on the connecting piece 268, force a disassembly movement against the arrow 282.

An application force providing for the proper application of the wiper strip 30 on the to-be-wiper window 15 and acting from the wiper arm 12 on the wiper blade 14 in the direction of arrow 17 (FIG. 1) is transmitted reliably from the wiper arm via the connecting part 18, the adapter 40 and the articulated part 20 to the wiper blade 14. The supporting element 22 effects the proper distribution of the application force over the entire longitudinal extension of the wiper strip 30.

It is clear from the descriptions of the exemplary embodiments that each wiper lever or each wiper blade is provided with locking means that are arranged on at least one of the two adapter walls and are moveable essentially transverse to the surfaces of these walls. Because of the arrangement of the locking devices in the area between the pendulum axis 16 of the wiper arm and the swivel axis of the wiper blade formed by the articulated pins 38, these locking devices are situated in a plane lying under the wiper arm 12 and are thereby extensively protected against unintentional actuation, particularly a detaching movement.

The invention claimed is:

1. Wiper lever (10) with a wiper arm (12) having a longitudinal extent and a wiper blade (14) linked to it to clean windows (15) which is provided with an elastic supporting element (22) that is constructed as an elongated band, that has opposite concave-curved and convex-curved band surfaces (26, 28) and that is curved in the longitudinal direction over its band surfaces (26, 28), which features a rubber elastic wiper strip (30) that can be applied to the window (15) on its concave-curved band surface (26), on whose convex-curved band surface (28) an articulated part (20) sits, on which an adapter (40) is positioned so that it can move in a pendulum fashion, which has walls aligned in the longitudinal direction of the wiper blade and above the band surfaces of the supporting element with planes situated at a distance from one another, and moveable locking means (68, 70) are arranged on the adapter, which cooperate with counter-locking means (66) of the wiper arm, characterized in that the locking means are arranged on at least one of the two walls (42) and are moveable essentially transverse to the surfaces of these walls, and characterized in that guiding means on the wiper arm and on the adapter cooperate during assembly to guide the wiper arm along an assembly path relative to the adapter, the guiding means including a guide slot extending along the assembly path and transverse to the longitudinal extent of the wiper arm.

2. Wiper lever according to claim 1, characterized in that the adapter (40) has a U-shaped cross-section at least in sections, whose U-legs (42) form the two walls between which supporting walls (34) embodied on the articulated part (20) suitably dip.

3. Wiper lever according to claim 2, characterized in that the adapter (40) suitably grips over two longitudinal walls (34) of the articulated part (20), which are situated at a distance from one another, with its U-legs (42), that articulation means (50, 38) are arranged on the longitudinal walls and on the U-legs (42) and that the locking means (72) of the adapter (40) that is composed of an elastic material are located on an extension (70) of the U-legs of the adapter extending beyond the longitudinal walls (34).

4. Wiper lever according to claim 3, characterized in that the wiper arm (12) that is driven in a pendulum fashion accommodates the adapter (40) with a connecting piece (18) that is U-shaped in cross-section and that the extension (70) of the adapter extends towards the pendulum axis (16).

5. Wiper lever according to claim 4, characterized in that the counter-locking means (66) that cooperate with the locking means (72) of the adapter (40) are located on each of two U-legs (52) of the connecting piece (18).

6. Wiper lever according to claim 2, characterized in that locking means (72) are arranged on each of the two U-legs (42) of the adapter (40).

7. Wiper lever according to claim 2, characterized in that articulation means of the articulated part (20) are formed by an articulated bolt (38) arranged on each longitudinal wall (34), whose axes are aligned with one another.

8. Wiper lever according to claim 2, characterized in that articulation means of the adapter (40) are formed by bearing receptacles (50) arranged in the U-legs (42), each of which are open-edged via an assembly channel (46) terminating on a free end of the U-legs (42) that has been coordinated with a diameter of a respective articulated bolt (38).

9. Wiper lever according to claim 8, characterized in that each assembly channel (46) is provided with an elastically expandable narrowing (48).

10. Wiper lever according to claim 2, characterized in that pin-shaped supports (156) that align with one another are arranged on each outer side of the U-legs (42) of the adapter (140) at a longitudinal end area facing away from the locking means (154), to which a support bearing (158) embodied on the U-legs (159) of the connecting piece (118) is assigned.

11. Wiper lever according to claim 2, characterized in that the locking means (248) of the adapter (240) that are arranged on an extension (254) of the U-legs (242) have a locking shoulder (248) pointing toward an articulated connection, with which a counter-locking shoulder (276) of the connecting piece (268) that points away from the articulated connection cooperates, when proper positioning has been achieved between the wiper arm (12) and the wiper blade (14).

12. Wiper lever according to claim 2, characterized in that a laterally projecting handle (256) is arranged on an extension (254) of the U-legs (242) that features the locking means (248) of the adapter (240).

13. Wiper lever according to claim 1, characterized in that guiding means (260, 280) located both on the connecting piece (268) of the wiper arm and on the wiper blade cooperate during assembly of these components and force their proper positioning vis-à-vis each other.

14. Wiper lever according to claim 13, characterized in that a projection (272) in the form of a collar is adjacent, with a supporting shoulder (288) that points towards a free end of a U-leg (242), to a counter shoulder (290) of the connecting piece (268).

15. Wiper lever according to claim 1, characterized in that the guiding means includes a guide pin engageable in and movable along the guide slot.

16. Wiper lever according to claim 15, characterized in that the guide slot is defined on the adapter and the guide pin is supported on the wiper arm.

17. Wiper lever according to claim 1, characterized in that the locking means and the counter-locking means having cooperating locking surfaces, in an assembled condition of the wiper arm and the adapter, the locking surfaces being oriented parallel to a plane, and characterized in that the guide slot extends transverse to the plane.

18. Wiper blade (14) to clean windows which is provided with an elastic supporting element (22) that is constructed as an elongated band, that has opposite concave-curved and convex-curved band surfaces (26, 28) and that is curved over its band surfaces (26, 28), which features a rubber elastic wiper strip (30) that can be applied to the window (15) on its concave-curved band surface (26), on whose convex-curved band surface (28) an articulated part (20) sits, on which an adapter (40) is positioned so that it can move in a pendulum fashion, which has a longitudinal extent and walls (42) aligned in the longitudinal direction of the wiper blade and above the band surfaces of the supporting element (22) with planes situated at a distance from one another, and locking means are arranged on the adapter that are moveable against a restoring force, which can cooperate with counter-locking means (72) of a wiper arm (12) that can be connected in an articulated manner to the wiper blade, characterized in that the locking means are arranged on at least one of the two walls (42) and are moveable essentially transverse to the surfaces of these walls, characterized in that the articulated part has a longitudinal extent and includes a pin defining an articulation axis, and characterized in that, with the longitudinal extent of the articulated part extending parallel to the longitudinal extent of the adapter, the locking means and the pin are arranged along a line generally parallel to a longitudinal extent of the articulated part.

* * * * *